US010675536B2

(12) United States Patent
Chen

(10) Patent No.: US 10,675,536 B2
(45) Date of Patent: Jun. 9, 2020

(54) GAMING SYSTEM THAT ALTERS TARGET IMAGES PRODUCED BY AN LED ARRAY

(71) Applicant: Song Chen, Livermore, CA (US)

(72) Inventor: Song Chen, Livermore, CA (US)

( * ) Notice: Subject to any disclaimer, the term of this patent is extended or adjusted under 35 U.S.C. 154(b) by 0 days.

(21) Appl. No.: 16/151,273

(22) Filed: Oct. 3, 2018

(65) Prior Publication Data
US 2020/0108312 A1  Apr. 9, 2020

(51) Int. Cl.
A63F 13/00 (2014.01)
A63F 13/426 (2014.01)
A63F 13/213 (2014.01)
A63F 13/837 (2014.01)
A63F 13/332 (2014.01)
A63F 13/53 (2014.01)
G06F 111/18 (2020.01)

(52) U.S. Cl.
CPC .......... *A63F 13/426* (2014.09); *A63F 13/213* (2014.09); *A63F 13/332* (2014.09); *A63F 13/837* (2014.09); *A63F 13/53* (2014.09); A63F 2300/1031 (2013.01); A63F 2300/1087 (2013.01); A63F 2300/8076 (2013.01); A63F 2300/8082 (2013.01); G06F 2111/18 (2020.01)

(58) Field of Classification Search
CPC .... A63F 13/213; A63F 13/537; A63F 13/655; A63F 13/79; A63F 13/837; A63F 13/92; A63F 2300/204; A63F 2300/205; A63F 2300/6045; A63F 2300/8076; G02B 2027/0138; H04N 5/2224; H04N 5/272
See application file for complete search history.

(56) References Cited

U.S. PATENT DOCUMENTS

| 6,559,884 | B1* | 5/2003 | Tamir ..................... H04N 5/222 348/135 |
| 8,226,011 | B2 | 7/2012 | Merkli et al. |
| 8,469,824 | B1 | 6/2013 | Farley et al. |
| 8,721,460 | B2 | 5/2014 | Rosenblum |
| 8,888,593 | B2 | 11/2014 | Larsen et al. |
| 8,951,128 | B1 | 2/2015 | Farley et al. |
| 2006/0223635 | A1* | 10/2006 | Rosenberg .............. A63F 13/10 463/37 |
| 2009/0005167 | A1 | 1/2009 | Arrasvuori et al. |
| 2010/0253766 | A1* | 10/2010 | Mann ...................... G06F 3/011 348/51 |
| 2011/0151955 | A1* | 6/2011 | Nave ..................... A63F 13/837 463/2 |
| 2013/0225288 | A1* | 8/2013 | Levin ..................... A63F 13/23 463/31 |
| 2014/0113728 | A1* | 4/2014 | Tezuka ................ G07F 17/3237 463/42 |
| 2016/0148433 | A1* | 5/2016 | Petrovskaya ......... G06T 19/006 345/633 |

(Continued)

*Primary Examiner* — Justin L Myhr
(74) *Attorney, Agent, or Firm* — Douglas L. Weller

(57) ABSTRACT

A gaming system includes a light emitting diode (LED) array consisting of a plurality of LEDs. A controller individually controls each LED in the plurality of LEDs. A gaming app runs on a computing device that has a camera and display screen. The gaming app receives images from the camera. The image include an image of the LED array. The gaming app alters the image of the LED array to produce an altered image where one or more lit LEDs is replaced with a virtual object. The gaming app displays the altered image on the display screen.

19 Claims, 6 Drawing Sheets

(56) References Cited

U.S. PATENT DOCUMENTS

| | | |
|---|---|---|
| 2016/0184698 A1 | 6/2016 | Tan |
| 2017/0078033 A1* | 3/2017 | Kawakami ........... H04B 17/318 |
| 2017/0296836 A1 | 10/2017 | Dobrynin et al. |
| 2017/0354864 A1* | 12/2017 | Rogers .................. A63F 13/213 |
| 2018/0180882 A1 | 6/2018 | Tuli |
| 2018/0180883 A1 | 6/2018 | Tuli |
| 2018/0200631 A1 | 7/2018 | Miller |
| 2018/0250586 A1 | 9/2018 | Bellingham et al. |

\* cited by examiner

US 10,675,536 B2

GAMING SYSTEM THAT ALTERS TARGET IMAGES PRODUCED BY AN LED ARRAY

BACKGROUND

Light emitting diode (LED) arrays are used for all kinds of light purposes, including illumination, decoration, mood setting and so on. Individual LEDs in LED arrays can often be independently programmable, allowing a user to select variations in color and brightness. Smartphones, computer laptops, computer tablets and other technology devices can be used to control LEDs in LED arrays.

DETAILED DESCRIPTION

A gaming system is disclosed that includes a light emitting diode (LED) array consisting of a plurality of light emitting diodes (LEDs). A controller individually controls each LED in the plurality of LEDs. A gaming app runs on a computing device that has a camera and display screen. The gaming app receives images from the camera. The images include an image of the LED array. The gaming app alters the image of the LED array to produce an altered image where one or more lit LEDs is replaced with a virtual object. The gaming app displays the altered image on the display screen.

For example, the LED array is organized as a string of LEDs. For example, the controller has wireless communication capability for wireless communication with the computing device. For example, the computing device is a smart phone. For example, the gaming system includes a virtual reality (VR) gaming system gun that includes a trigger, where the computing device is a smart phone that is mounted on the VR gaming system gun. For example, the controller supports a plurality of wireless protocols. For example, the controller includes a microphone. For example, the gaming system includes a game controller.

In one implementation, a smartphone uses a rear facing camera to capture an image of one or more LEDs in an LED array. A game app within the smartphone uses digital imaging processing techniques and computer vision algorithms to identify which LEDs in the LED array are activated "on"—i.e., lit—so as to emit light. The game app recognizes a pattern of activated LEDs within the LED array patterns and makes use of virtual reality or augmented reality technologies to turn the recognized pattern into a virtual object, such as cartoon character. In a first person shooter (FPS) game, a user can use a gunsight on the smartphone to aim and shoot at the virtual object. The smartphone determines a location of the virtual object and thus correct aim and a "hit" based on a detected location of the pattern of activated LEDs. Hits can be tallied to calculate a score.

Figure 1:
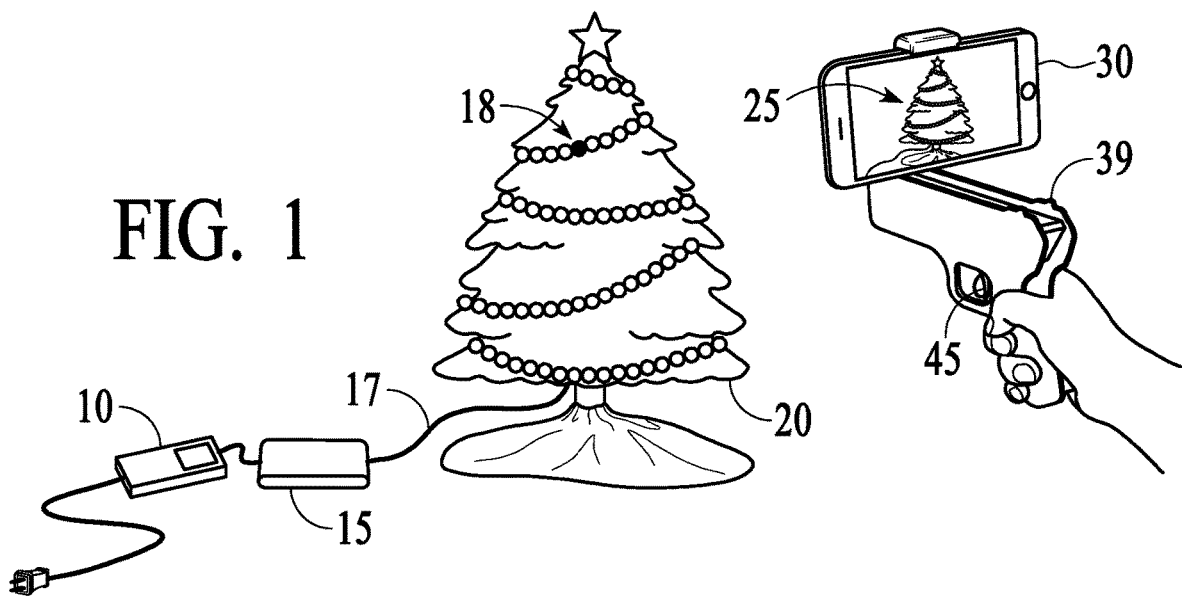
FIG. 1 illustrates an interactive gaming system that uses a light emitting diode array in accordance with an implementation.

For example, FIG. 1 shows an augmented reality gaming system that includes LED array 18. For example, LED array 18 is shown as a string of LED lights. LED array 18 may be arranged in any pattern depending upon the game and user preferences. For example, each LED in LED array 18 is individually addressable to allow individual control of brightness, and color of each LED.

A power supply 10 provides power to LED array 18. For example, power supply 10 is an AC-DC converter capable of delivering enough power to supply sufficient power to simultaneously power all LEDs in LED array 18 at full brightness. An LED array controller 15 determines which, if any, of LEDs in LED array 18 are activated to emit light. Brightness and color of individual LEDs within LED array are also controlled via LED controller unit 15. The LED array is connected to the LED controller unit via wires 17. For example, a separate address for each LED in LED array 18 is pre-programmed or stored within LED controller unit 15. For example, a communication interface between LED array 18 and LED controller 15 is a type of serial interface such as 1-wire, UART, I2C, SPI, or some other common or proprietary interface. For example, controller unit 15 is able to sequentially program and light up each LED in LED array 18.

The LED array is supported by a support structure 20. For example, in FIG. 1, support structure is shown to be a Christmas tree. Other types of support structures may be used, limited only by the imagination of a user. A smartphone 30 has a rear facing camera.

FIG. 1 shows a graphic user interface for a game app displayed on a display screen 25 of smartphone 30. While herebelow, the implementation described refers to use of a smartphone, instead of a smartphone, a tablet computer, a laptop computer or another type of computing device can be used where the computing device includes or can be connected to a camera and a display screen. A virtual reality (VR) gaming system gun 39 has a trigger 45. Smartphone 30 is shown mounted on VR gaming system gun 39.

Figure 2:
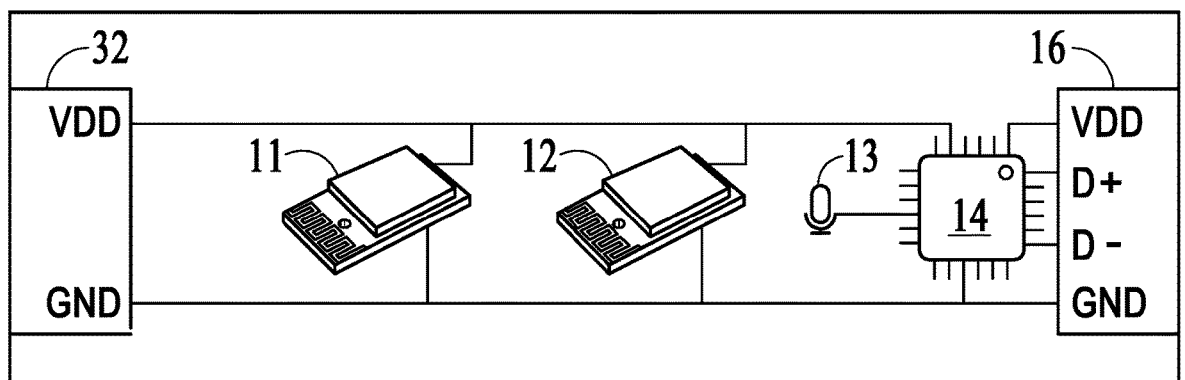
FIG. 2 shows an LED array, a controller and a power supply in accordance with an implementation.
Figure 3:
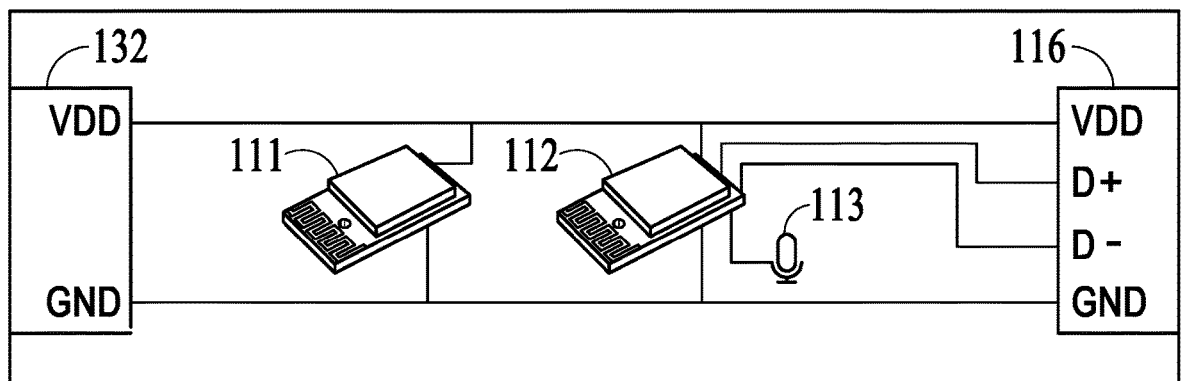
FIG. 3 shows an LED array, a controller and a power supply design in accordance with another implementation.

FIG. 2 shows a simplified block diagram of one implementation of LED controller 15. In FIG. 3, LED controller is shown to include power input wires 32, a Wi-Fi module 11, a Bluetooth low energy (BLE) module 12, a microphone 13, a micro-controller unit (MCU) 14, and an output port 16. A pattern to be displayed on the LEDs of LED array 18 can be received by LED controller 15 wireless via a WiFi signal or a Bluetooth signal. Pattern data is then translated to a format that can be programmed into LED array 18 by MCU 14. MCU 14 programs LED array 18 through output port 16. The wiring of the port 16 depends on the serial interface used by LED string 18.

FIG. 3 shows a simplified block diagram of another implementation of LED controller 15. In FIG. 3, LED controller is shown to include power input wires 132, a Wi-Fi module 111, a Bluetooth low energy (BLE) module 112, a microphone 113 and an output port 116. Within BLE module 112 is a micro controller unit (MCU) that can be used instead of a standalone MCU within LED controller 15. A pattern to be displayed on the LEDs of LED array 18 can be received by LED controller 15 wireless via a WiFi signal or a Bluetooth signal. Pattern data is then translated to a format that can be programmed into LED array 18 by the MCU within BLE module 112. The MCU within BLE module 112 programs LED array 18 through output port 116. The wiring of the port 116 depends on the serial interface used by LED string 18.

Figure 4:
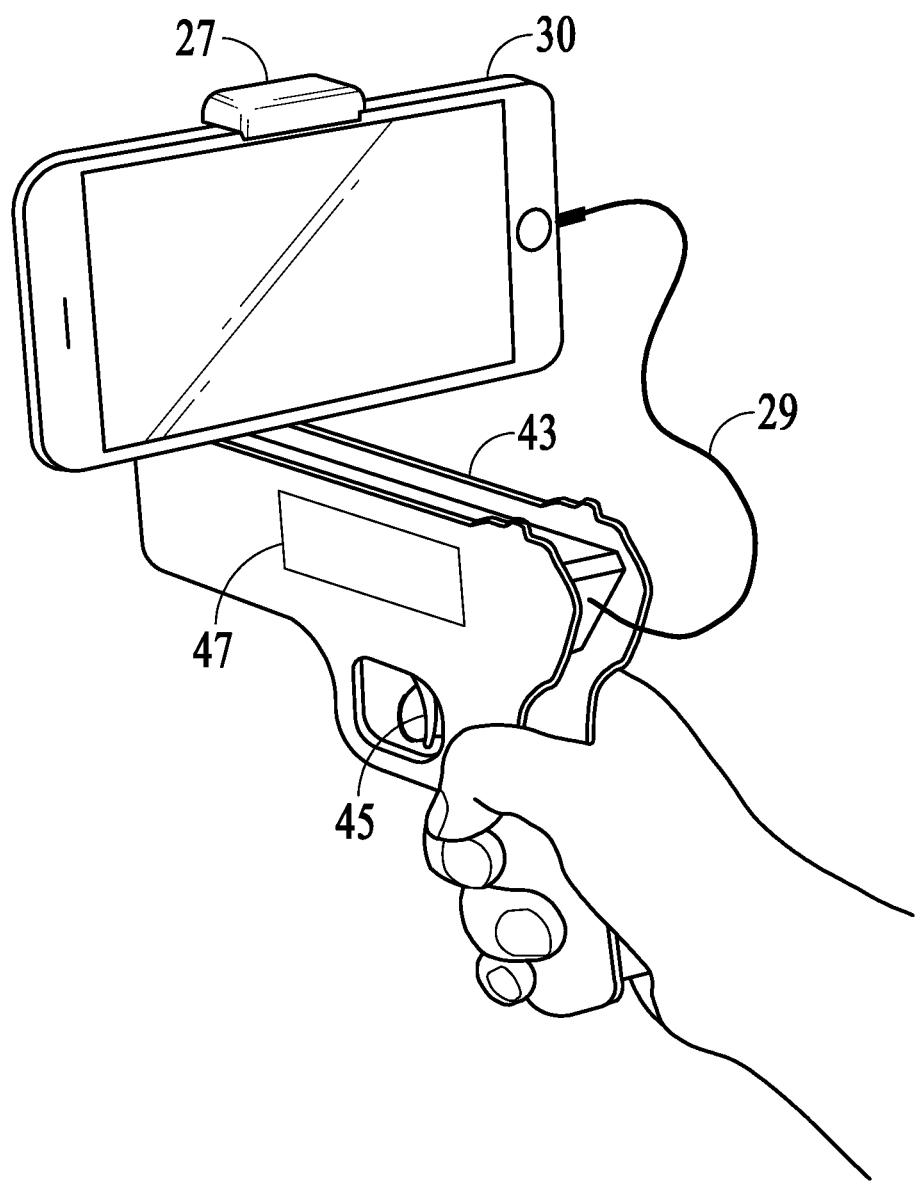
FIG. 4 shows a smartphone mounted on a gaming system gun in accordance with an implementation.

FIG. 4 shows an exemplary implementation of VR gaming system gun 39. VR gaming system gun 39 is shown to include a main body 43, an electronic circuit 47 embedded within main body 43, a trigger 45, and a smartphone clamp 27. A clamp 27 is used to fix smartphone 30 on top of VR gaming system gun 39. For example, the linkage between trigger 45 and smartphone 30 is wireless. Alternatively, the linkage between trigger 45 and smartphone 30 is wired through a cable 29.

Figure 5:
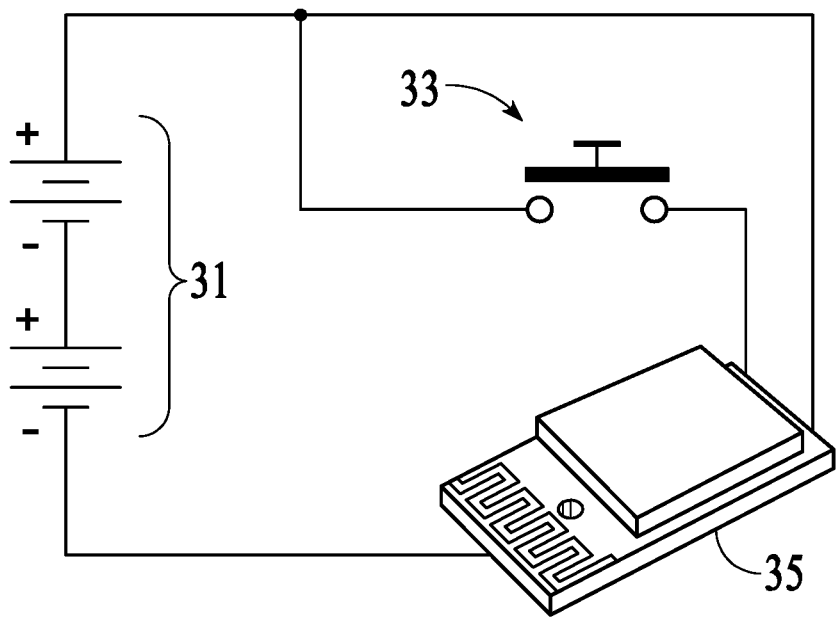
FIG. 5 is a simplified block diagram of an electronic circuit within a gaming system gun in accordance with an implementation.

FIG. 5 shows a simplified block diagram for electronic circuit 47. Electronic circuit 47 is shown to include batteries 31, a switch 33 and a Bluetooth Lower Energy (BLE) module 35. For example, switch 33 is a pushbutton switch, or some other type of switch. For example, switch 33 is mechanically linked to trigger 45 so that a pull action on trigger 45 causes state change in switch 33. The state change in switch 33 causes a voltage change within electronic circuit 47. For example, switch 33 is connected to an input pin of BLE module 35, such that a change of voltage level on the input pin resulting from a state change of switch 33 can be sensed by BLE module 35. For example, as result of the change of voltage on the input pin, electronic circuit 47 sends a packet of data, wirelessly transmitted to smartphone 30.

Figure 6:
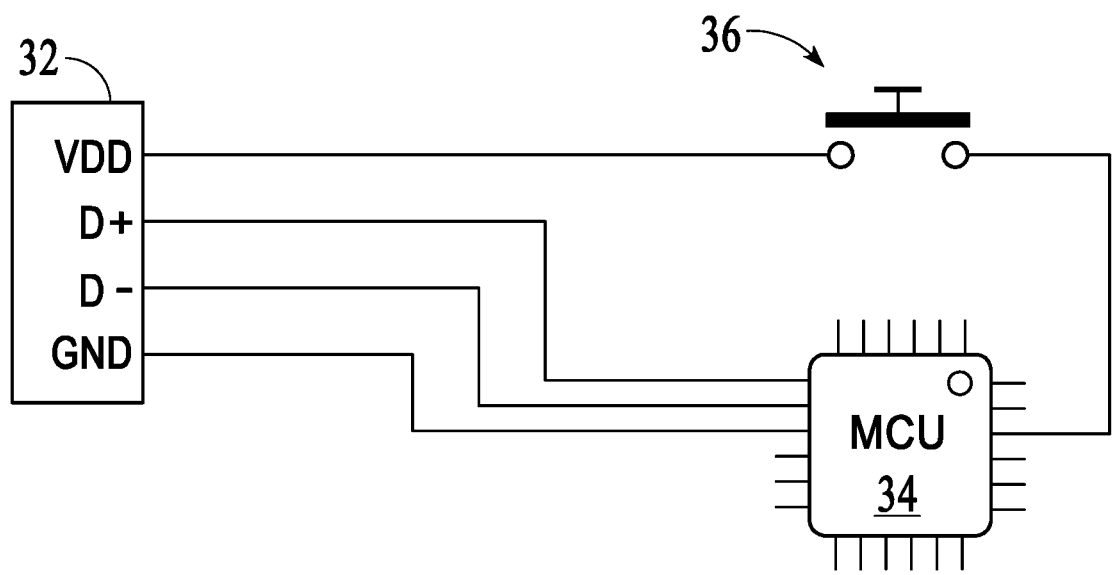
FIG. 6 is a simplified block diagram of an electronic circuit within a gaming system gun in accordance with another implementation.

FIG. 6 shows a simplified block diagram for another implementation of a circuit design for electronic circuit 47. Electronic circuit 47 is shown to include a universal serial bus (USB) 32, a switch 36 and an MCU 34. For example, switch 36 is a pushbutton switch, or some other type of switch. For example, switch 36 is mechanically linked to trigger 45 so that a pull action on trigger 45 causes state change in switch 36. The state change in switch 36 causes a voltage change within electronic circuit 47. For example, switch 36 is connected to an input pin of MCU 34, such that a change of voltage level on the input pin resulting from a state change of switch 36 can be sensed by MCU 34. For example, as result of the change of voltage on the input pin, electronic circuit 47 sends a packet of data, wirelessly transmitted to smartphone 30.

Figure 7:
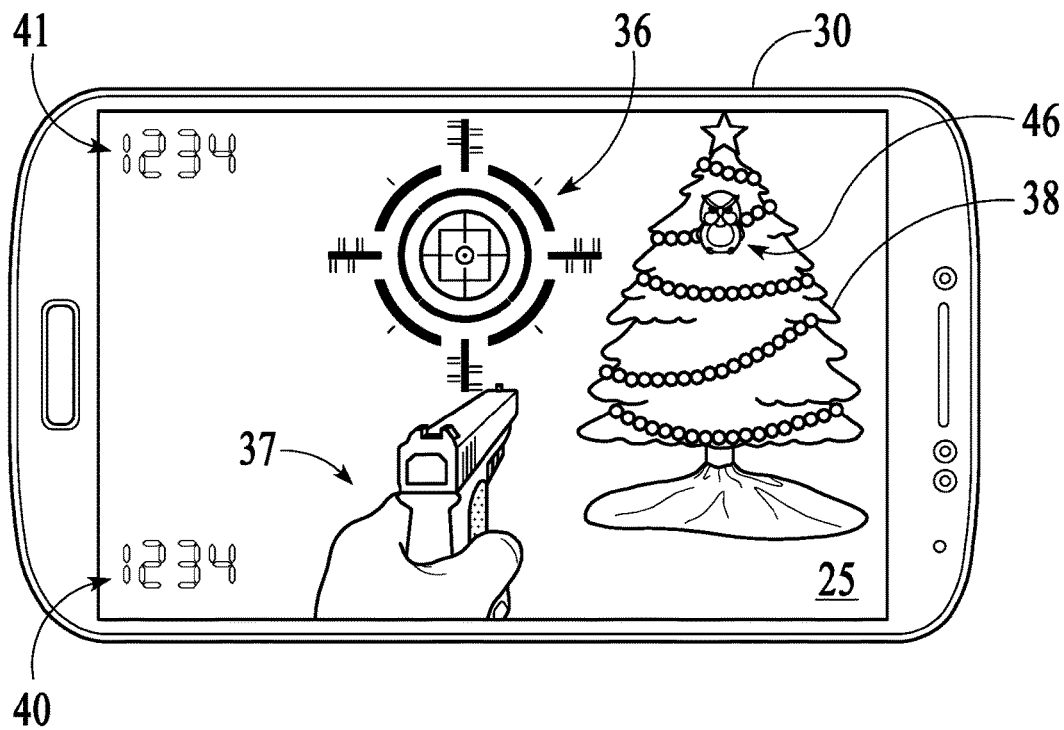
FIG. 7 illustrates a graphic user interface design on a smartphone in accordance with an implementation.

FIG. 7 illustrates operation of a graphic user interface (GUI) design of an AR game app running on smartphone 30. Once the rear facing camera of smartphone 30 is turned on, an object image 38 captured by the rear facing camera will be shown on display screen 25 of smartphone 30. For example, image 38 includes an image of LED array 18. A virtual gun 37 and a virtual gun sight 36 are overlaid on the images displayed on display screen 25 to provide a player with a first person view of a gaming area. The view of images displayed on display screen 25 will change to reflect changes in the direction and location of rear facing camera; however, the location of virtual gun 37 and virtual gun sight 36 will remain unchanged relative to display screen 25. In accordance with known AR techniques, the image of a lit LED from LED array is replaced by a game character 46. For example, game character 46 is a cartoon owl, or some other cartoon figure or realistic figure. Also shown on display screen 25 are a score value 41 and a game timer 40.

Figure 8:
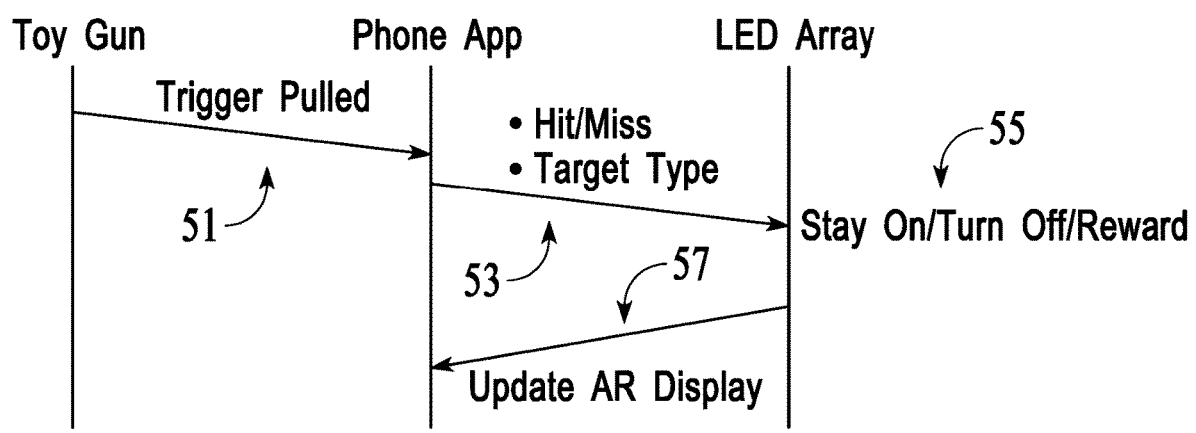
FIG. 8 illustrates communication within an interactive gaming system in accordance with an implementation.

FIG. 8 is a simplified flow timing diagram that illustrates a communication protocol between VR gaming system gun 39, smartphone 30, and LED controller 15. When trigger 45 detects a trigger pulling action. VR gaming system gun 39 sends a notification message 51 to smartphone 30. After receiving notification message 51, the game app running on smartphone 30 determines whether VR gaming system gun 39 is aimed accurately at a center of a lit LED or LED pattern formed by one or more LEDs of LED array 18 that are lit. If aim is accurate there is a hit. If aim is not accurate, there is a miss. After determining whether VR gaming system gun 39 is aimed accurately, smartphone 30 sends a message 53 to LED controller 15. Message 53 indicates to LED controller 15 whether there is a hit or miss. LED controller 15 examines message 53 to determine whether there is a hit or miss. LED controller 15 provides a communication 55 to the player to indicate to the player whether there is a hit or a miss. For example, LED controller 15 lights up one pattern of LEDs within LED array 18 to communicate there is a hit and LED controller 15 lights up a different pattern of LEDs within LED array 18 to communicate there is a miss. Sound may also be generated to signify a hit. Then LED controller 55 sends a response message 57 back to smartphone 30. Response message 57 signals smartphone 30 to update the graphics user interface. For example, the update includes a change in score.

Figure 9:
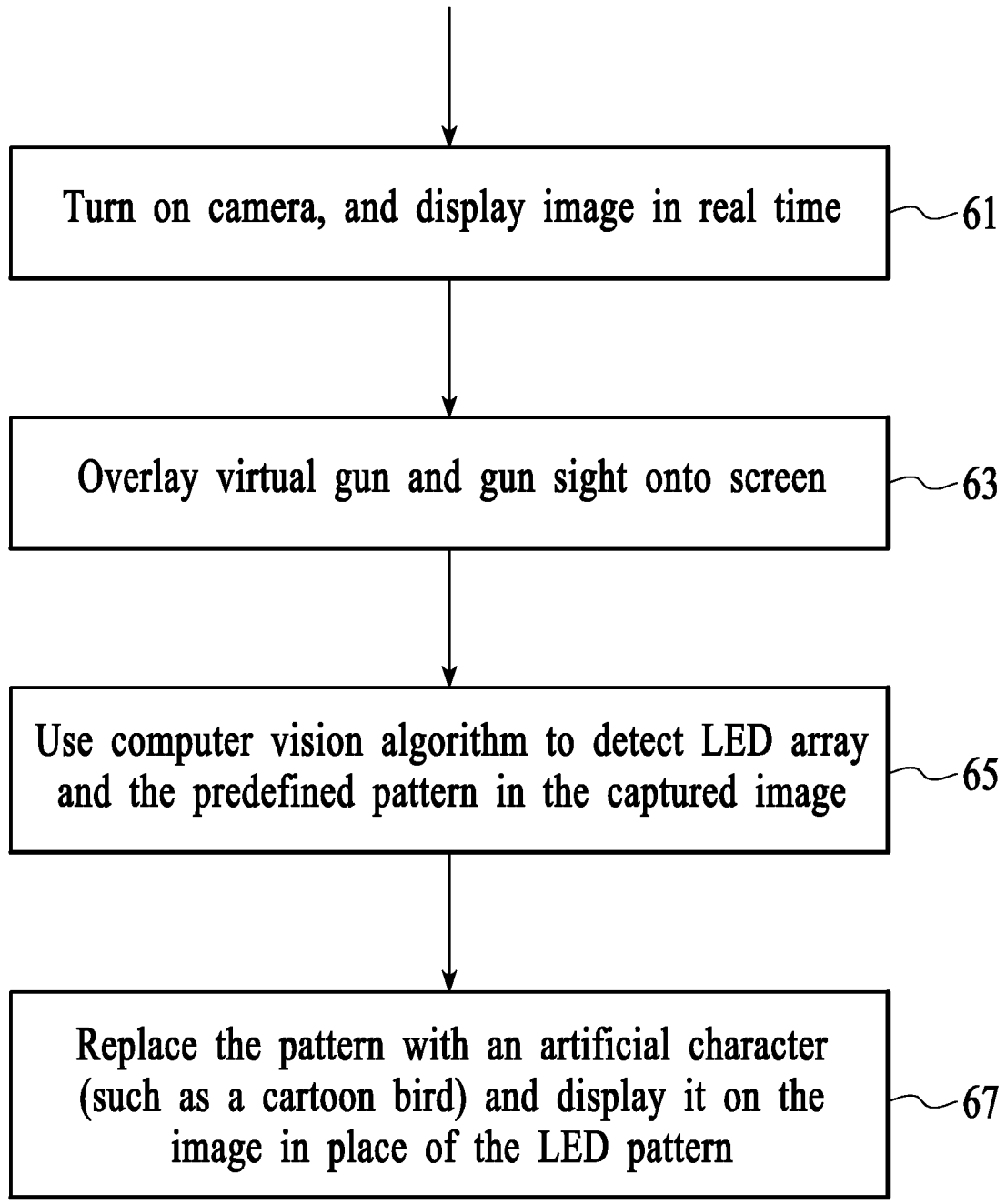
FIG. 9 is a simplified flowchart illustrating steps to generate augmented reality effects within a game app in accordance with an implementation

FIG. 9 is a simplified flowchart illustrating steps to generate augmented reality effects within the game app running on smartphone 30. In a block 61, the game app turns on the rear facing camera of smartphone 30 and displays the captured images on display screen 25 of smartphone 30. In a block 63, the game app running on smartphone 30 overlays virtual gun 37 pointing toward the back side of the smartphone 30. The game app running on smartphone 30 also overlays gun sight 37 on display screen 25 of smartphone 30.

In a block 65, the game app running on smartphone 30 uses a computer vision algorithm to detect LED array 18 and recognizes pre-defined pattern of one or more lit LEDs in one or more image frames captured by the rear facing camera of smartphone 30. In a block 67, the game app running on smartphone 30 replaces the detected recognizes pre-defined pattern of one or more lit LEDs with an artificial character (such as a cartoon bird) and displays the artificial character on display screen 25 of smartphone 30 in place of the pre-defined pattern of one or more lit LEDs.

Figure 10:
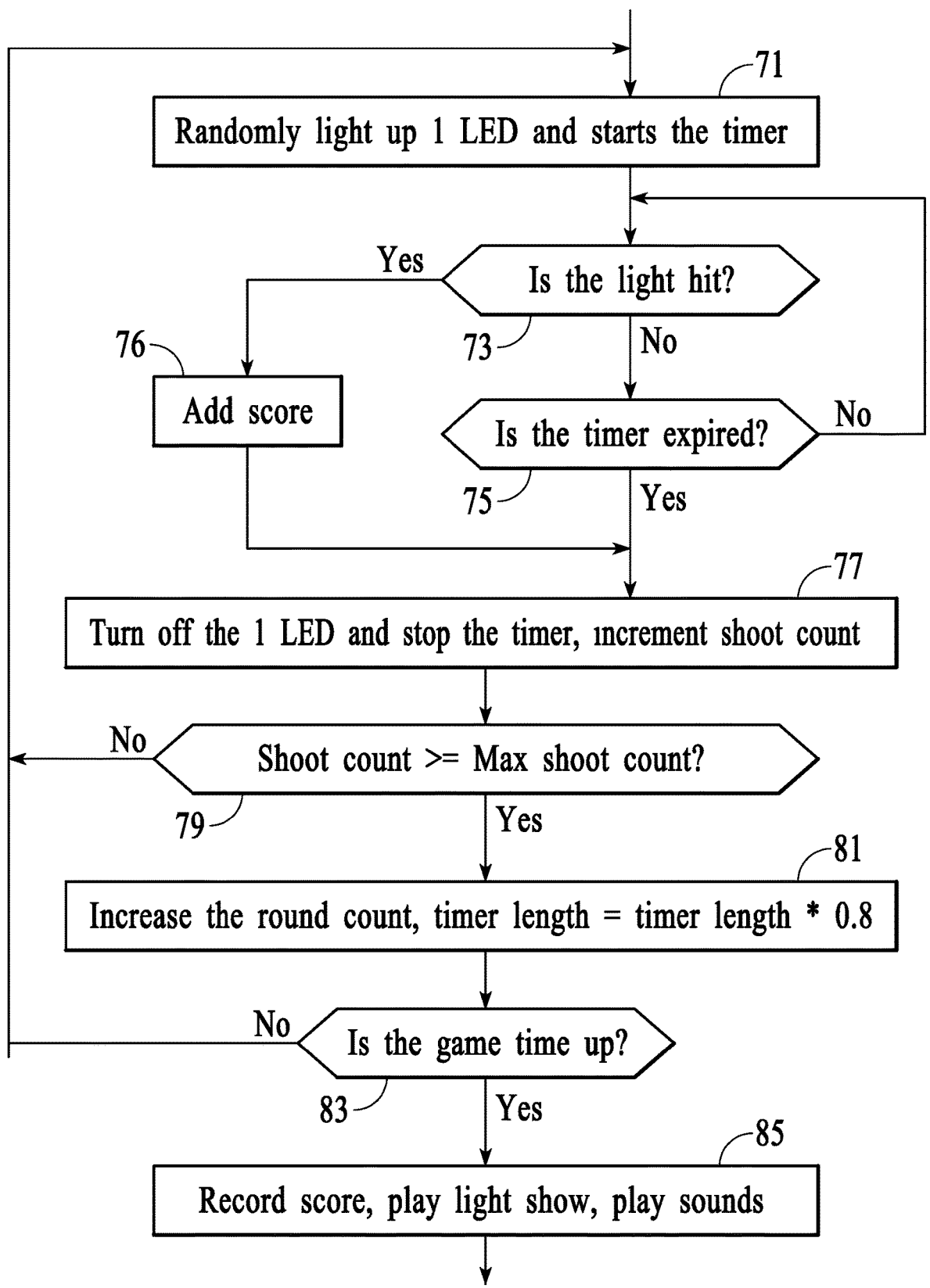
FIG. 10 is a simplified flowchart illustrating operation of a score-keeping algorithm for a game app in accordance with an implementation.

FIG. 10 is a simplified flowchart illustrating operation of score-keeping algorithm for a game app running on smartphone 30. In a block 71, after initialization, one or more LEDs within LED array 30 is randomly lit up and, simultaneously, a timer is set to a maximum time duration for a current job to be performed by the player is started. In a block 73, image processing techniques are used to determine whether the LED pattern composed of the lit one or more LEDs is centered within virtual gun sight 36 overlaid on display screen 25. When the LED pattern composed of the lit one or more LEDs is centered within virtual gun sight 36 overlaid on display screen 25, an activation of trigger 45 on VR gaming system gun 39 will result in a "hit" of the target. Upon detecting a "hit", in a block 76, game app running on smartphone 30 updates score value 41 displayed on display screen 25.

When in block 73 there is no hit, in a block 75 a check is made to see if the timer has expired. When the timer has expired, in a block 77, the LED pattern is turned off. In a block 79, a check is made as to whether a predetermined maximum number of shots in the current round has been taken. If in block 79 the check shows the predetermined maximum number of shots in the current round has not been taken, the game app running on smartphone 30 returns to block 71 where one or more LEDs within LED array 30 is randomly lit up and, simultaneously, a timer is set to a maximum time duration for a current job to be performed by the player is started.

If in block 79 the check shows the predetermined maximum number of shots in the current round has been taken, in a block 81, the round count is incremented by 1 and the shoot timer is decreased by 20% to increase game difficulty.

In a block 83, an elapsed time check is made to determine if a predetermined game time value has been reached. If in block 83, the elapsed time check determines the game time is up, in a block 85, a scoreboard is shown on display screen 25 of smartphone 30 and a "light show" is displayed on LED array 30 to celebration completion of the game. Optionally, smartphone 30 can emit celebratory sounding audio signals. If in block 83, the elapsed time check determines the game time is not up, the game app running on smartphone 30 returns to block 71 where one or more LEDs within LED array 30 is randomly lit up and, simultaneously, a timer is set to a maximum time duration for a current job to be performed by the player is started.

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A gaming system, comprising:
    a plurality of targets implemented by a light emitting diode (LED) array consisting of a plurality of LEDs that emit visible light, each target in the plurality of targets consisting of at least one lit LED from the plurality of LEDs;
    a controller that controls targets by controlling when each LED in the plurality of LEDs is lit and when each LED is off;
    a computing device in wireless communication with the controller, the computing device including:
        a camera, and
        a display screen; and
    a gaming app running on the computing device;
    wherein the gaming app receives images of the plurality of targets from the camera, the images including an image resulting from visible light emitted from the LED array;
    wherein the gaming app alters the image resulting from the visible light emitted from the LED array to produce virtual target image for each target in the plurality of targets where one or more lit LEDs is replaced with a virtual object; and,
    wherein the gaming app displays the virtual target image on the display screen as a virtual target for the gaming system.

2. A gaming system as in claim 1, wherein the LED array is organized as a string of LEDs.

3. A gaming system as in claim 1, wherein the wireless communication is performed using a WiFi protocol.

4. A gaming system as in claim 1, wherein the wireless communication is performed using a Bluetooth protocol.

5. A gaming system as in claim 1, wherein the computing device is a smart phone.

6. A gaming system as in claim 1 additionally comprising:
    a virtual reality (VR) gaming system gun that includes a trigger;
    wherein the computing device is a smart phone that is mounted on the VR gaming system gun.

7. A gaming system as in claim 1, wherein the controller supports a plurality of wireless protocols.

8. A gaming system as in claim 1, wherein the controller includes a microphone.

9. A gaming system as in claim 1, additionally comprising a game controller.

10. A gaming system, comprising:
    a light emitting diode (LED) array consisting of a plurality of LEDs the plurality of LEDs implementing a plurality of targets where each target in the plurality of targets consists of at least one lit LED from the plurality of LEDs;
    a controller that controls targets by controlling when each LED in the plurality of LEDs is lit and when each LED is off; and
    a gaming app that runs on a computing device that has a camera and display screen;
    wherein the gaming app receives images of the plurality of targets from the camera, the images including an image resulting from visible light emitted from the LED array;
    wherein the gaming app alters the image resulting from the visible light emitted from the LED array to produce a virtual target image for each target in the plurality of targets where one or more lit LEDs is replaced with a virtual object; and,
    wherein the gaming app displays the altered virtual target image on the display screen as a virtual target for the gaming system.

11. A gaming system as in claim 10, wherein the LED array is organized as a string of LEDs.

12. A gaming system as in claim 10, wherein the controller has wireless communication capability for wireless communication with the computing device.

13. A gaming system as in claim 12, wherein the wireless communication is performed using a WiFi protocol.

14. A gaming system as in claim 12, wherein the wireless communication is performed using a Bluetooth protocol.

15. A gaming system as in claim 10, wherein the computing device is a smart phone.

16. A gaming system as in claim 10 additionally comprising:
    a virtual reality (VR) gaming system gun that includes a trigger;
    wherein the computing device is a smart phone that is mounted on the VR gaming system gun.

17. A gaming system as in claim 10, wherein the controller supports a plurality of wireless protocols.

18. A gaming system as in claim 10, wherein the controller includes a microphone.

19. A gaming system as in claim 10, additionally comprising a game controller.

* * * * *